United States Patent [19]
Palazzo

[11] Patent Number: 5,816,435
[45] Date of Patent: Oct. 6, 1998

[54] DOUBLE WALL STORAGE TANK HAVING AN EXTRUDED OUTER SHEATH AND A METHOD FOR MAKING SAME

[76] Inventor: David T. Palazzo, P.O. Box 290676, Tampa, Fla. 33687

[21] Appl. No.: 735,610

[22] Filed: Oct. 23, 1996

[51] Int. Cl.$^6$ ..................................................... B65D 6/00
[52] U.S. Cl. ........................................ 220/586; 220/591
[58] Field of Search .................................. 220/586, 587, 220/588, 589, 590, 591, 449, 455, 469, 4.13

[56] References Cited

U.S. PATENT DOCUMENTS

| | | | |
|---|---|---|---|
| Re. 34,203 | 3/1993 | Palazzo | 220/445 |
| 2,814,313 | 11/1957 | Tate | 220/591 X |
| 3,074,584 | 1/1963 | Dobell | 220/586 X |
| 3,616,006 | 10/1971 | Landgraf et al. | 156/188 |
| 3,687,765 | 8/1972 | MacLean et al. | 156/187 |
| 3,802,908 | 4/1974 | Emmons | 117/72 |
| 4,130,453 | 12/1978 | Hollister | 156/187 |
| 4,178,200 | 12/1979 | Hakert | 156/187 |
| 4,523,454 | 6/1985 | Sharp | 73/49.2 |
| 4,596,619 | 6/1986 | Marks | 220/591 X |
| 4,640,439 | 2/1987 | Palazzo | 220/445 |
| 4,644,627 | 2/1987 | Palazzo | 29/423 |
| 4,655,367 | 4/1987 | Palazzo | 220/445 |
| 4,660,738 | 4/1987 | Ives | 220/591 X |
| 4,744,137 | 5/1988 | Palazzo | 29/455 R |
| 4,780,946 | 11/1988 | Palazzo | 29/455.1 |
| 4,780,947 | 11/1988 | Palazzo | 29/455.1 |
| 4,844,287 | 7/1989 | Long | 220/455 X |
| 4,927,050 | 5/1990 | Palazzo | 220/445 |
| 5,439,711 | 8/1995 | Vu et al. | 427/430.1 |
| 5,494,183 | 2/1996 | Sharp . | |

OTHER PUBLICATIONS

Brochure entitled: *Extrusion Technology*, by Genca (1995).
Brochure entitled: *Thermoplastic Powder Coatings and Equipment*, by Plastic Flamecoat Systems (no date).
Brochure entitled: *Advanced Technology for Industrial Products Production*, by Advanced Plasma Systems, Inc. (no date).
Technical Service Memorandum entitled: *Suface Treatment of Marlex Polyolefins for Decorating and Adhesive Bonding*, by Phillip Chemical Company (Aug. 1979).

*Primary Examiner*—Steven M. Pollard
*Attorney, Agent, or Firm*—Carlton Fields

[57] ABSTRACT

A double wall tank for the storage of liquids is manufactured from a rigid, inner tank by helically extruding a synthetic resin outer sheath over the inner tank while preventing bonding between the extruded outer sheath and the inner tank.

12 Claims, 4 Drawing Sheets

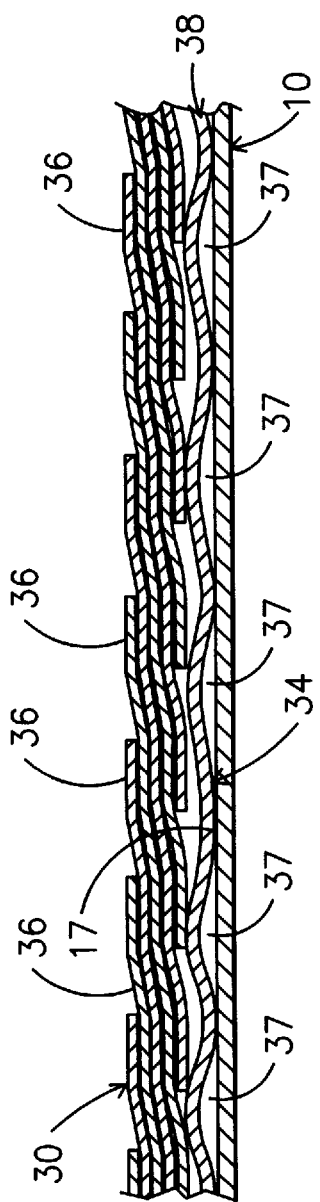
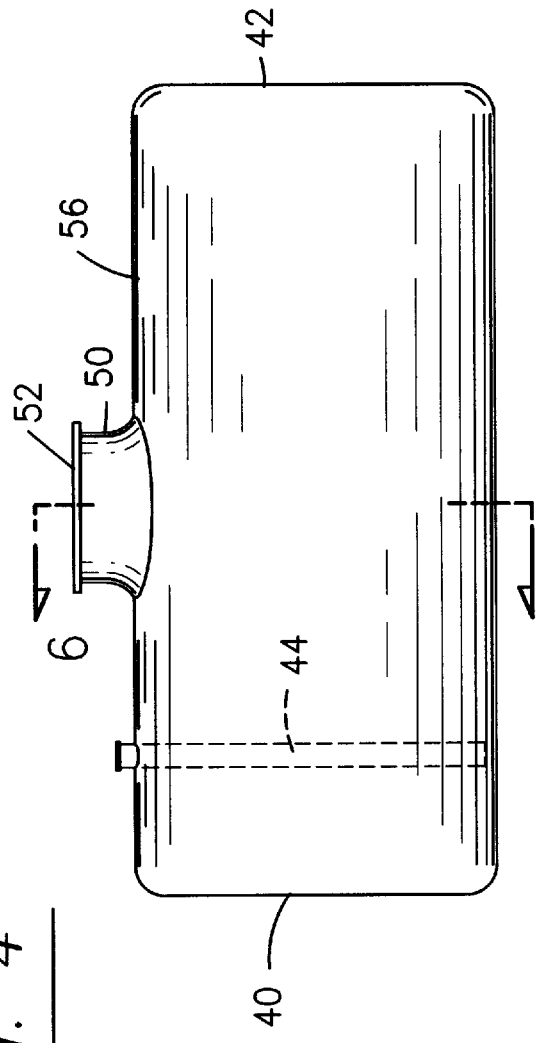
Fig. 4
Fig. 5

sum …

DOUBLE WALL STORAGE TANK HAVING AN EXTRUDED OUTER SHEATH AND A METHOD FOR MAKING SAME

FIELD OF INVENTION

This invention relates to tanks for the storage of liquids, and more particularly to multiple wall tanks for the storage of liquids. Even more specifically, the invention relates to a multiple wall storage tank having an outer sheath of a synthetic resin material extruded therefrom and a method for making such tank.

BACKGROUND OF THE INVENTION

Tanks for the storage of liquids have been constructed in a variety of ways from a variety of materials. In one common application, the storage of hydrocarbons, such as gasoline and other petroleum products, the tanks have conventionally been fabricated out of steel or fiberglass, most commonly with a single rigid wall. In many applications, this construction has proved reasonably satisfactory, with such tanks functioning properly for many years before requiring repair or replacement. However, the increasing age of many of the tanks currently in place is beginning to present serious environmental dangers. Many of the older steel tanks buried underground have rusted and are beginning to leak, thus releasing the petroleum materials into the ground where they may seep into and pollute underground water supplies. While rust-proof, some fiberglass tanks have also exhibited leakage, causing similar problems.

One of the primary problems with leaking storage tanks has been the difficulty or inability to ascertain when or if such leaks are occurring from a given tank. Because the excavation and removal of such a storage tank, which may contain thousands of gallons of fuel, is an expensive and difficult undertaking, such an operation is difficult to justify unless there is some evidence of actual leakage.

Because of the increasing potential danger of leaking storage tanks, particularly in communities that utilize ground water for public consumption, many municipalities have implemented or plan to implement ordinances requiring the use of double wall storage tanks underground and requiring replacement of existing single wall tanks. While the installation of a conventional double wall tank in a new facility entails no great difficulty and a generally manageable increase in cost over a single wall tank, a heavy burden exists for complying with such ordinances by replacing existing sound, single wall tanks with double wall tanks. This burden has prompted the search for methods of fabricating relatively inexpensive double wall or multi-wall tanks. This burden has also given impetus to the search for a method of remanufacturing existing single wall tanks into double or multi-wall assemblies with means for detecting the presence of any leaks into the space between the walls.

Several methods for manufacturing double wall tank assemblies have been developed, including that disclosed by David T. Palazzo, the inventor of the present invention, in U.S. Pat. No. 4,640,439 and its progeny. These patents generally disclose applying a spacing material over a rigid inner tank and bonding resin impregnated glass fiber mats to the exterior surface of the inner tank to form a double wall tank. While conventional glass fiber provides a relatively effective and inexpensive outer sheath, other materials, such as polyolephins, exist that may provide a convenient and cost effective alternative to forming a substantially liquid impervious outer shell around the rigid inner tank.

SUMMARY OF THE INVENTION

In view of the foregoing, it is an object of the present invention to provide an economical method of manufacturing a double wall storage tank from a rigid, single wall tank. It is a further object of the invention to provide a multiple wall storage tank having a generally rigid, liquid-impervious outer sheath that is detached from at least a substantial portion of the inner tank. Still another object of the present invention is to provide an efficient and relatively simple method of manufacturing a multiple wall storage tank from a rigid, single wall tank.

To achieve these and other objects that will become readily apparent to those skilled in the art, this invention provides a method of manufacturing a multiple wall tank for the storage of liquid from a substantially rigid inner tank. This method includes providing a rigid inner tank having an exterior surface comprising generally cylindrical side wall portions and end portions that are generally transverse to the side wall portions, with a central axis extending generally longitudinally between the end portions, and then helically extruding plurality of partially overlapping layers of a substantially liquid impervious, synthetic resin material over the inner tank exterior surface while preventing bonding between at least a substantial portion of the synthetic resin material layer and the inner tank exterior surface.

BRIEF DESCRIPTION OF THE DRAWINGS

Particularly preferred embodiments of the present invention will be described in detail below in connection with the following drawings in which:

FIG. 4 is a magnified fragmentary, sectional view taken along line 4—4 of the tank of FIG. 3, illustrating the various layers of material; and FIG. 5 is a side elevation of a completed tank in accordance with the present invention.

DETAILED DESCRIPTION OF PREFERRED EMBODIMENTS

Figure 1:
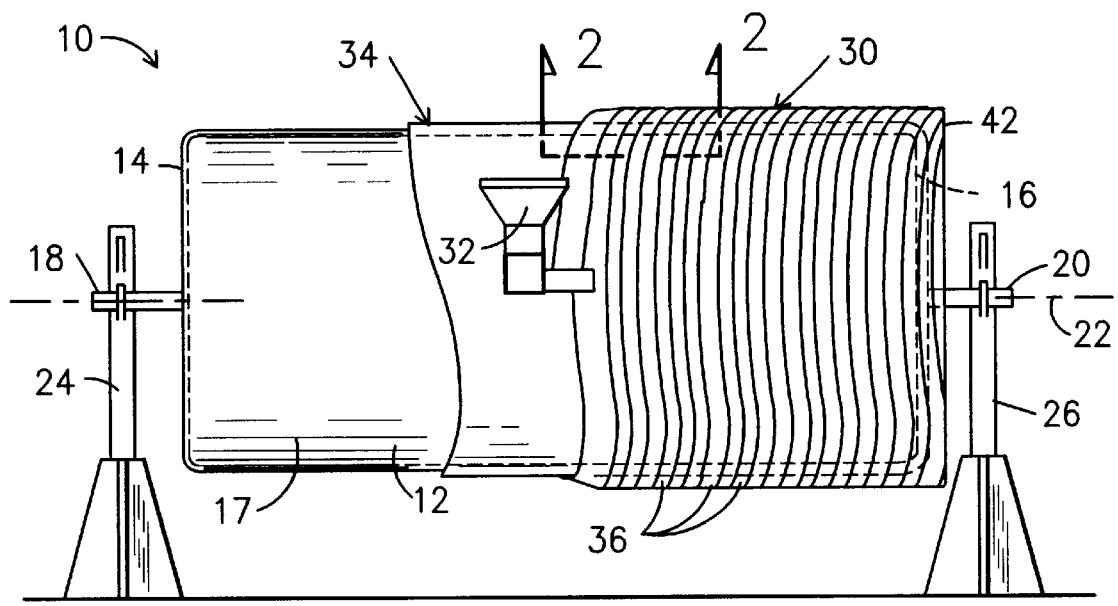
FIG. 1 is a side elevation, partially in section, of a tank according to the present invention, illustrating various steps in the fabrication process.

Preferred embodiments of the apparatus of the present invention are illustrated in FIGS. 1–6, in which similar reference numbers refer to corresponding elements in the various views. FIG. 1 illustrates a tank fabricated according to a preferred method of the present invention, in which is provided a rigid inner tank, generally indicated as 10, having generally cylindrical sidewall portions 12, end portions 14 and 16, which are generally transverse to the sidewall portions 14 and 16. Elongated spindle members 18 and 20 are attached to and extend outwardly of each of the end portions 14 and 16, respectfully, generally coaxially with the central axis of the inner tank 10, illustrated as reference number 22. As illustrated in FIG. 1, the spindle members 18 and 20 may be supported by fixed supports 24 and 26 upon which the inner tank 10 may conveniently be rotated about its axis 22, such as by a motor or any conventional means, to facilitate the fabrication of the multiple wall storage tank. Alternatively, rather than having spindle members 18 and 20 attached to the end portions 14 and 16 of the inner tank 10, two or more straps, such as continuous belts, may be positioned around the tank sidewall portions 12. The straps may then be simultaneously advanced in a conventional manner in order to rotate the tank 10 generally about its longitudinal axis 22.

While various forms and shapes of tanks may be utilized in practicing this invention, the most common shape utilized for such storage tanks is that of a cylinder, generally a right circular cylinder, having closed end portions 14 and 16. For simplicity of illustration this configuration of tank is utilized for illustrating a preferred embodiment of this invention. Also, while virtually any construction of rigid inner tank 10, whether metal, fiberglass or other known materials, may be utilized in practicing this invention, one preferred and readily available type of structure is a tank formed of welded steel, having an appropriate corrosion resistant coating on its surfaces. Although the inner tank may have a corrosion resistant coating, it is not strictly necessary because a later applied outer sheath acts as a corrosion resistant barrier. For purposes of illustration such a metal inner tank 10 will be described. It is also to be understood that the tank 10 may be a newly fabricated tank, which may or may not have a manway opening or fittings cut through it, or it may be a previously used tank removed from its prior installation and cleaned for remanufacturing in accordance with this invention.

To prepare an uncoated or previously used metal inner tank 10, it is desirable that the exterior surface of the tank be conventionally grit blasted and coated with a known rust inhibitive material. It is preferred that the spindle members 18 and 20 may be attached, suitably by welding, to the center of the end portions 14 and 16, generally coaxial with the tank axis 22, as set forth above. Where a tank includes apertures, such as a manway or other holes, it may be desirable to cover or close such apertures, such as by welding an appropriately configured sheet of steel generally flush with the inner tank exterior surface 17.

As shown in FIG. 1, the next step includes helically extruding in situ an outer sheath of a synthetic resin material, such as a thermoplastic resin, a thermosetting resin, a catalyzing resin or other appropriate synthetic resins, over the inner tank 10 while preventing bonding between at least a substantial portion of, and preferably the entire, outer sheath 30 and the inner tank exterior surface 17. In a preferred embodiment of the present invention, synthetic resin material comprises a molten thermoplastic resin material, such as a polyolefin, namely polyethylene or polypropylene, suitably having a temperature in the range from about 150 degrees Fahrenheit to about 600 degrees Fahrenheit. Preferably, at least a portion of the outer sheath 30 is spaced from at least a portion of the inner tank exterior surface 17, suitably at least the lower portion, by a release material, generally indicated as 34.

Figure 3:
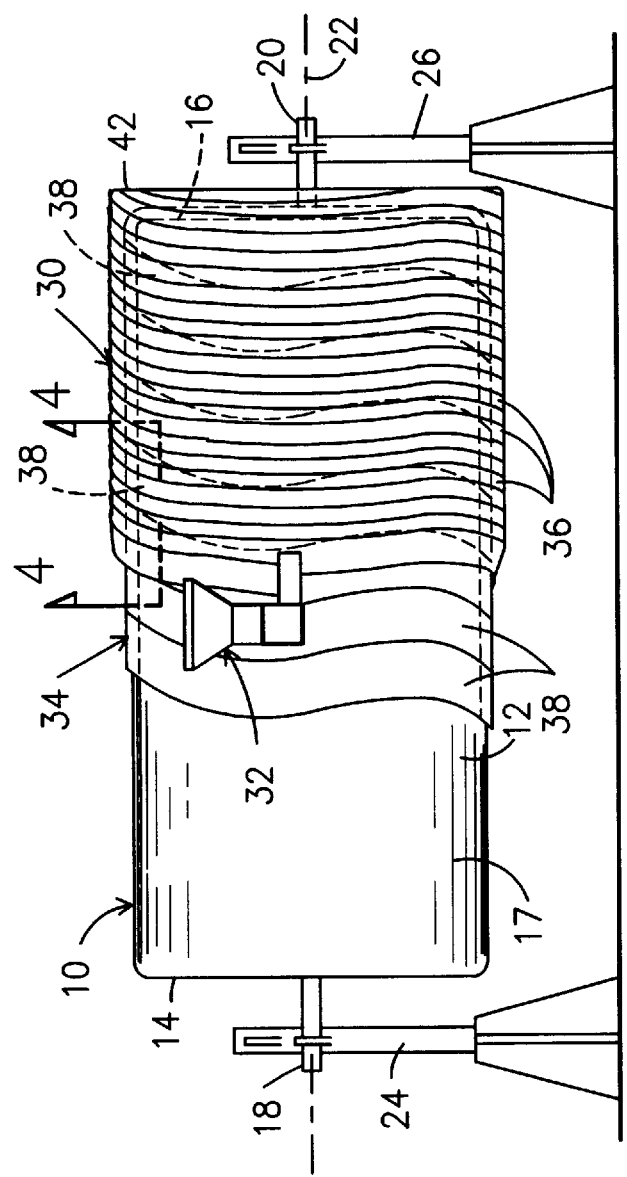
FIG. 3 is a side elevation, partially in section, of an alternative preferred embodiment of the tank of FIG. 1.

As shown in FIGS. 1 and 3, the outer sheath 30 is preferably helically extruded by a conventional extruding apparatus 32 such as, for example, extruder systems available from Genca of Clearwater, Fla., as a plurality of partially overlapping strips or layers 36. The layers 36 are conveniently heated to a molten state to facilitate bonding between the plurality of partially overlapping layers 36 to form a substantially liquid impervious outer wall. In addition, after the layers 36 of outer sheath 30 have been applied over the inner tank 10, the layers may be conveniently heated to further bond the overlapping layers to provide a substantially monolithic outer wall 30. Each extruded successive overlapping layer 36 of the outer sheath 30 has a predetermined width that is substantially less than the axial length of the cylindrical sidewall portions of inner tank 10, suitably in the range from about four inches to about twelve inches. Preferably, each successive overlapping layer 36 is extruded such that at least half, and suitably about two-thirds to about four-fifths, of the width of each layer overlaps the preceding layer, shown in FIGS. 1 and 3. Of course, a greater amount of overlap may be desirable to enhance the strength of the outer sheath 30.

Figure 2:
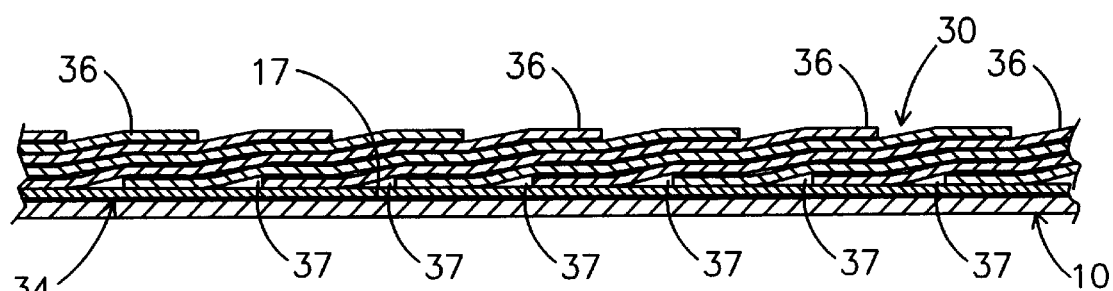
FIG. 2 is a magnified fragmentary, sectional view, taken along line 2—2 of the tank of FIG. 1, illustrating the various layers of material.

As shown in the preferred embodiments of FIGS. 2 and 4, the plurality of partially overlapping layers 36 are extruded such that the overlapping layers 36 form a corrugated inner surface of outer sheath 30 that defines a plurality of channels 37 intermediate the outer sheath and the inner tank suitably adjacent the inner tank exterior surface 17. These channels 37 preferably extend adjacent the sidewall portions 12 generally circumferentially about inner tank 10 between the inner tank and the outer sheath 30 to provide for desired substantially free flow of liquids between the inner tank and the outer sheath as well as increase the stiffness of the outer sheath in the radial direction with respect to axis 22. A portion of the corrugated inner surface, or a material attached thereto, may engage the inner tank exterior surface 17, still allowing the flow of liquids. By modifying the amount of overlap between the extruded layers 36 of outer sheath 30, the number of channels may conveniently be increased or decreased, with a corresponding change in the strength of outer sheath 30.

As shown in FIGS. 1–4, the preferred embodiment of the present invention includes providing the release material 34 intermediate the inner tank exterior surface 17 and the subsequently applied outer sheath 30 to prevent bonding between the outer jacket 30 and the inner tank 10, and thereby effect substantially free passage of liquids along a substantial portion of the inner tank exterior surface 17. The release material 34 may conveniently be formed of any material that may prevent the bonding between the extruded outer sheath 30 and the inner tank exterior surface 17 and provide for substantially free passage of liquids along a substantial portion of the inner tank exterior surface 17. Appropriate selection of release material 34 may also provide for bonding to the extruded layers of outer sheath 30 and thereby substantially reduce sagging of the outer sheath as applied. Release material 34 is applied between the outer sheath 30 and the inner tank 10, which material may conveniently be applied directly to the inner tank 10 or be co-extruded with the outer sheath 34. Where release material 34 is co-extruded with or applied or co-applied to the inner surface of the outer sheath 30, release material 34 preferably is applied proximal and forward of the leading edge of each extruded layer 38 such that release material 34 does not substantially interfere with the engagement or hinder the bonding between each successive overlapping layer 38. In this manner, release material 34 may prevent bonding between outer sheath 30 and inner tank 10 while not adversely affecting the bonding between successive overlapping layers of outer sheath 30.

Suitable examples of release material 34 include, without limitation conventional liquid mold release agents, silicone, polyvinyl acetate (PVA), polyolefins in the form of mesh, nets or films, grease, dust or powders, oxidation products, wax, grease as well as other release materials known in the art. The appropriate release material 34, used typically will depend upon the material selected for outer sheath 30.

For example, where the outer sheath 30 is extruded as molten thermoplastic material, such as polyethylene, a preferred embodiment of release material 34 may include applying a relatively thin sheet of an imperforate material, suitably having generally smooth surfaces, over the properly prepared inner tank exterior surface 17. A suitable such imperforate material 34 should have higher melting temperature than the temperature of the molten thermoplastic outer sheath when extruded, such that, as the heated outer sheath 30 is applied over and engages release material 34, material 34 wrinkles or forms a plurality of crinkles as shown in FIG. 4, but does not melt. The crinkles in release material 34 define a plurality of ridges, or grooves, preferably generally circumferentially about inner tank 10 adjacent the inner surface of the outer sheath 30. The wrinkles of material 34, which may be in addition to channels 37 of the outer sheath 30, may provide for the desired substantially free flow of liquids between the outer sheath 30 and the inner tank 10.

The release material 34 may, for example, be formed of an elongated sheet, or film, of a polyester resin material such as MYLAR®. Preferably, as shown in FIG. 3, such an elongated sheet 38 of release material is spirally wrapped around the exterior surface of tank 10 from end to end in partially overlapping layers, suitably as the tank 10 is rotated about its axis 2. This may occur before or during the extrusion of the outer sheet 30. There should be sufficient overlap between adjacent layers of sheet 38 such that at least some overlap between successive layers is maintained after the wrinkling occurs.

To form the end portions 40 and 42 of the outer sheath 30, the synthetic resin material may simply be extruded, as shown in FIG. 1, over the inner tank end resin material portions 14 and 16. For the example when spindle members are employed to support inner tank 10, the polyethylene would be extruded from spindle member 18 to spindle member 20, forming a continuous jacket structure over the cylindrical sidewalls 12 of inner tank 10 and end walls 14 and 16. To complete the end portions 40 and 42 most of the length of each such spindle member 18 and 20 is removed from each respective end portion 14 and 16 and a patch of a substantially liquid-tight synthetic resin material, suitably polyethylene, is attached, such as by welding or heat bonding, to the end portions covering the area from where the respective spindle members 18 and 20 were removed.

Alternatively, each end portion 42 may be fabricated separately from the cylindrical wall of the outer sheath. This method of forming the end portions separately may simplify the manufacturing process by permitting the formation of each end cap 42 over a male mold plug that would be appropriately secured and bonded to the extruded outer sheath 30 by welding or any other manner known to those skilled in the art. While end cap 42 is illustrated in the drawings as substantially flat, it will be appreciated and understood by those skilled in the art that each end cap 42 may also be in the form of a preformed cup or dome-shaped end cap. In addition, the end caps may conveniently be attached to the inner tank prior to extruding the outer sheath 30, such that when it is extruded, the outer sheath will substantially conform to the shape of the end cap 42. Thus, by providing a synthetic resin layer, suitably a material equivalent to or compatible to bond with the outer sheath material, on each preformed end cap 40 and 42, the bonding between the end portions of the outer sheath and the end caps may be facilitated.

Figure 6:
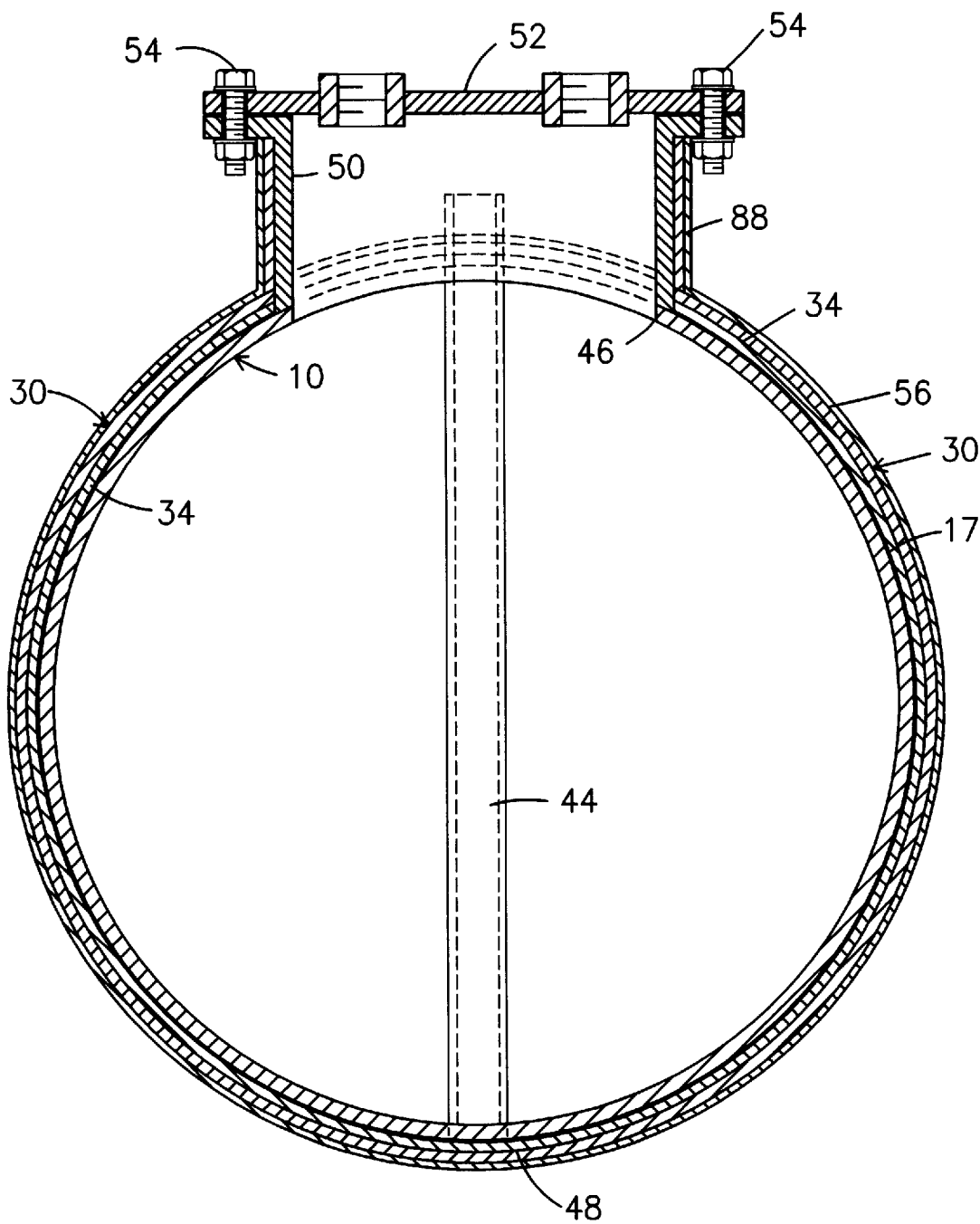
FIG. 6 is an end sectional view taken along line 6—6 of the tank of FIG. 5.

As shown in FIGS. 5 and 6 the completed view of a preferred embodiment of the tank may include a pipe or tube 44 extending through the tank itself for use in monitoring and detecting the presence of liquids or a change in pressure in the volume between inner tank 10 and the outer sheath. The tube 44 may conveniently be installed into an aperture 46 formed through the tank, which aperture suitably may include a threaded fitting. The tube 44 is inserted through the outer sheath 30 and aperture 46 and conveniently extends through and is sealed to an aperture formed in the lowermost portion of inner tank 10 so that the lower portion of tube 44 is positioned between the inner tank 10 and the outer sheath 30. Substantially, liquid-tight joints between the tube 44 and the inner tank 10 are formed in a conventional manner, such as by welding to the inner tank 10. The tube 44 may conveniently extend completely through the inner tank 10 and into the interstitial space 48 between the outer sheath 30 and the inner tank 10 to test for fluids or changes in pressure, such that liquid disposed within the interstitial space may conveniently be detected by apparatus within or connected to tube 44 or contacted by and withdrawn through the tube 44.

The remaining steps involved in the manufacture of the tank of the present invention generally depend upon the nature of the inner tank 10 used in manufacturing multiple wall storage tank of the present invention. In general, if not already done, appropriate holes may be cut by any suitable means, such as a hole saw or the like, to define or reform apertures. Then, suitable piping and a cylindrical member 52, such as for a manway, may be appropriately secured, suitably by welding or threading to the apertures of the tank. In addition, the piping or manway may be secured to the inner tank 10, such as by threading or welding. A cover plate 52 may conveniently be secured to the upper flange of the cylindrical member 50 by a conventional means, such as bolts 54. When all the fittings and cover plates are secured to the tank, an appropriate resin 56 may be applied over the tank to yield a finished structure such as shown in the views of FIGS. 5 and 6.

By the foregoing construction there is provided a multiple wall tank that can be manufactured economically from a conventional single wall tank, and even from a used tank that has previously been removed from underground storage use. This structure provides an extruded outer sheath, which may be formed from a material that is free of tendency to rust or corrode, and at least a portion of which may be free from the inner tank exterior surface to define an interstitial space in which the collection and detection of liquids may be determined, such as by simply detecting the presence of liquids or a change in pressure within that space. In addition, by increasing the number and/or thickness of overlapping layers in the outer sheath, its strength and integrity may be further enhanced.

While the foregoing describes in detail preferred embodiments of the present invention, it is to be understood that such description is illustrative only of the principles of the invention and is not to be considered limitative thereof. Because numerous variations and modifications of the present invention will readily occur to those skilled in the art, the scope of this invention is to be limited solely by the claims appended hereto.

What is claimed is:

1. A double wall tank for the storage of liquids comprising:

a substantially rigid inner tank having an exterior surface comprising generally cylindrical sidewall portions and end portions generally transverse to said sidewall portions, and a central axis extending generally longitudinally between said end portions;

an outer sheath formed of a synthetic resin material extruded in situ, said extruded outer sheath having a plurality of partially overlapping layers positioned around said inner tank exterior surface intermediate said end portions, with said outer sheath being detached from a substantial portion of said inner tank exterior surface to define an interstitial space formed between at least a substantial portion of said outer sheath and said inner tank, which interstitial space provides for substantially free passage of liquids between said outer sheath and said inner tank, such that the interstitial space may be monitored for leakage.

2. The double wall tank according to claim 11 further comprising:

a layer of an imperforate material interposed between said inner tank and said outer sheath, said layer having a plurality of ridges positioned generally circumferentially along said side wall portions to define said interstitial space and to provide for substantially free passage of liquids between a substantial portion of said inner tank exterior surface and said outer sheath.

3. The double wall tank of claim 2 wherein said imperforate material comprises a polyester resin.

4. The double wall tank of claim 2 wherein said extruded synthetic resin material comprises a thermoplastic resin material.

5. The double wall tank of claim 1 wherein said plurality of partially overlapping layers are extruded such that said overlapping layers form an outer jacket having a corrugated inner surface with corrugations extending adjacent said sidewall portions in a generally circumferential direction about said inner tank, whereby the stiffness of the jacket is increased radially with respect to the longitudinal axis of the inner tank.

6. The double wall tank of claim 5 further comprising a layer of imperforate material positioned between said inner tank and said outer sheath, said layer of imperforate material having a plurality of wrinkles adjacent said corrugated inner surface to provide for substantially free flow of liquids in said interstitial space between said inner tank and said outer sheath.

7. The double wall tank according to claim 5 further comprising:

a release material interposed between said inner tank and said outer sheath to provide for substantially free passage of liquids in said interstitial space between a substantial portion of said inner tank exterior surface and said outer sheath.

8. The double wall tank according to claim 7 wherein said release material comprises a layer of an imperforate material, said layer having a plurality of ridges positioned generally circumferentially along said sidewall portions.

9. The double wall tank of claim 7 wherein said release material comprises a thin sheet of a polyolefin material.

10. The double wall tank of claim 5 wherein said corrugated inner surface defines a plurality of channels intermediate said outer sheath and said inner tank to provide for substantially free flow of liquids between said inner tank and said outer sheath.

11. The double wall tank according to claim 1 further comprising:

a release material interposed between said inner tank and said outer sheath to provide for substantially free passage of liquids in said interstitial space between a substantial portion of said inner tank exterior surface and said outer sheath.

12. The double wall tank of claim 1 wherein said synthetic resin material of said outer sheath comprises a polyolefin material.

* * * * *

UNITED STATES PATENT AND TRADEMARK OFFICE
CERTIFICATE OF CORRECTION

PATENT NO. : 5,816,435
DATED : October 6, 1998
INVENTOR(S) : David T. Palazzo

It is certified that error appears in the above-indentified patent and that said Letters Patent is hereby corrected as shown below:

In column 7, line 9 change "claim 11" to --claim 1--.

Signed and Sealed this

Twenty-sixth Day of January, 1999

*Attest:*

*Attesting Officer*  *Acting Commissioner of Patents and Trademarks*